Dec. 11, 1956     ISAO FUJII     2,773,352
ROTARY PUMP AND MOTOR FLUID DRIVE
Filed April 22, 1952     5 Sheets-Sheet 1
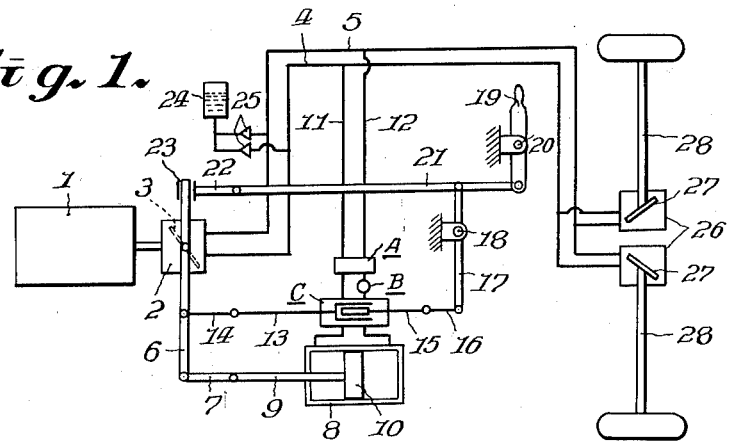
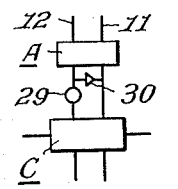 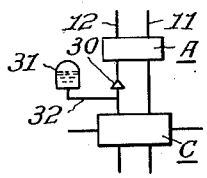 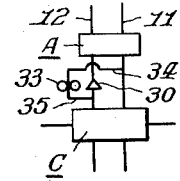
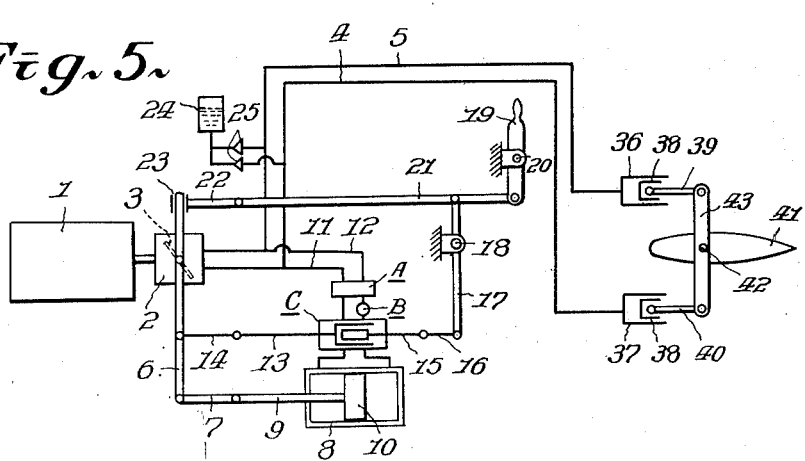
INVENTOR.
Isao Fujii
BY
ATTORNEY.

Dec. 11, 1956            ISAO FUJII            2,773,352
ROTARY PUMP AND MOTOR FLUID DRIVE
Filed April 22, 1952            5 Sheets-Sheet 2
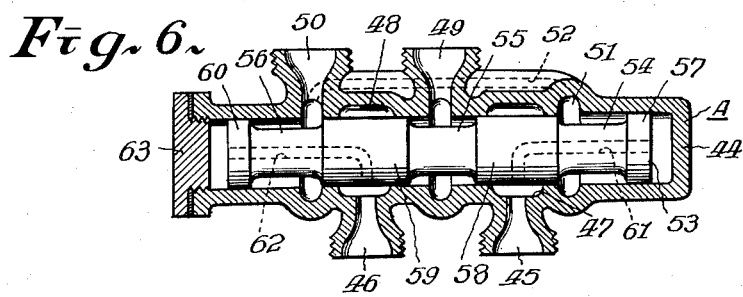
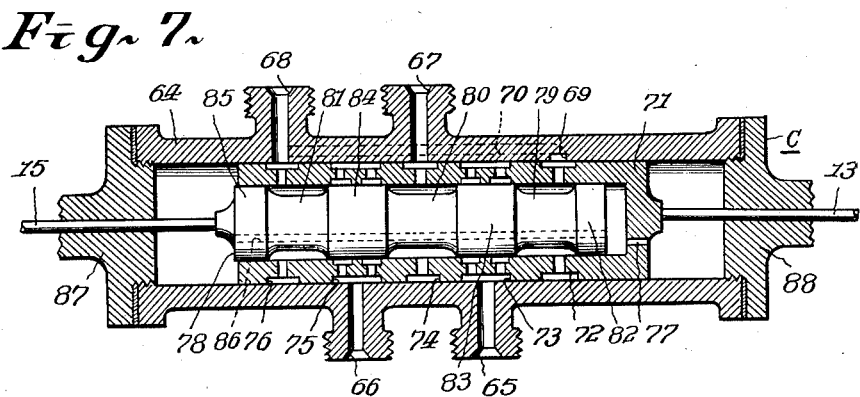
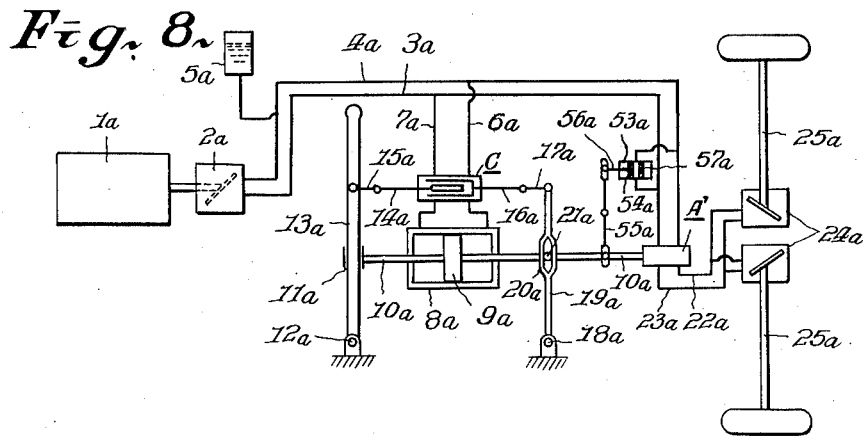
INVENTOR.
Isao Fujii
BY
ATTORNEY.

Dec. 11, 1956  ISAO FUJII  2,773,352
ROTARY PUMP AND MOTOR FLUID DRIVE
Filed April 22, 1952  5 Sheets-Sheet 4
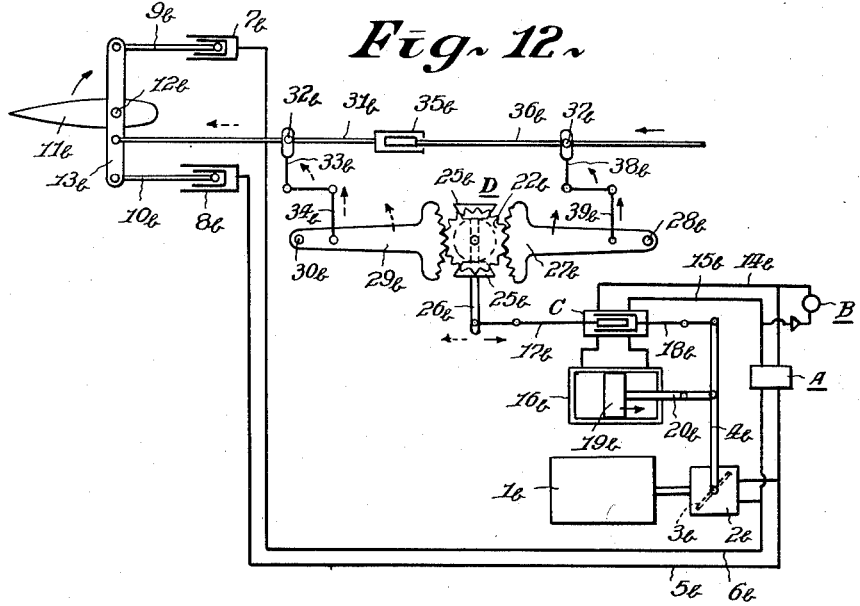
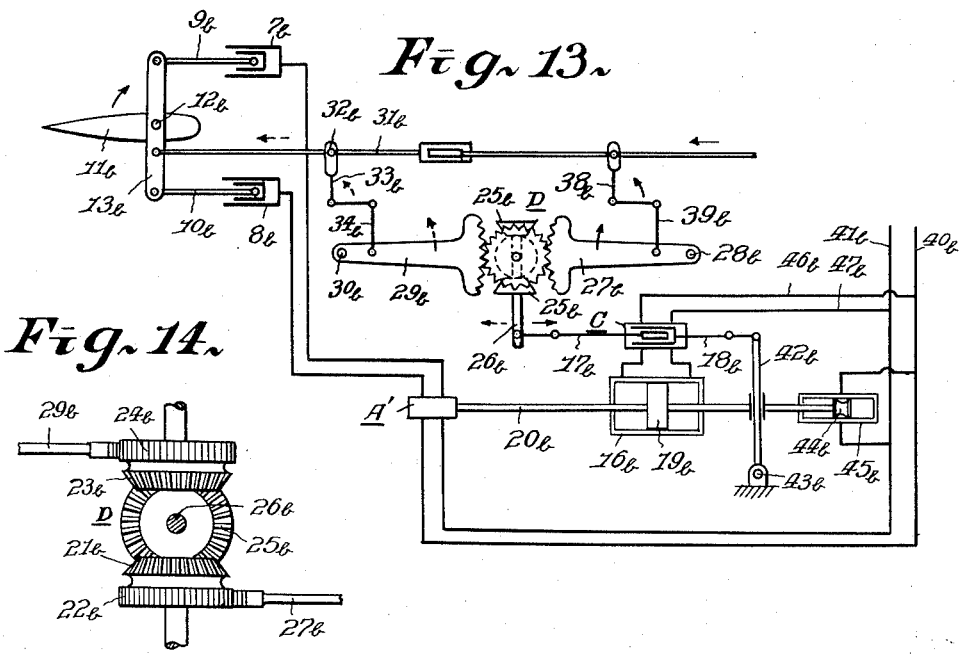
INVENTOR.
Isao Fujii
BY Robert E. Burns
ATTORNEY.

Dec. 11, 1956 ISAO FUJII 2,773,352
ROTARY PUMP AND MOTOR FLUID DRIVE
Filed April 22, 1952 5 Sheets-Sheet 5

INVENTOR.
Isao Fujii
BY
ATTORNEY.

United States Patent Office 2,773,352
Patented Dec. 11, 1956

2,773,352

ROTARY PUMP AND MOTOR FLUID DRIVE

Isao Fujii, Setagaya-ku, Tokyo-to, Japan

Application April 22, 1952, Serial No. 283,712

Claims priority, application Japan May 3, 1951

9 Claims. (Cl. 60—53)

The present invention relates to a power transmission apparatus operated by hydraulic fluid pressure and adapted to be used for driving automobiles, armored vehicles and tractors and for marine steering gear.

It is an object of this invention to provide a simple apparatus of the character indicated which can drive a fluid-actuated motor by pressure fluid without any clutch, speed controlling device, or braking device.

Another object of this invention is to provide a power transmission apparatus for an endless track vehicle which can be controlled very simply and freely without being seriously affected by dry, wet, or curved roads.

According to the present invention, there is provided apparatus for transmitting power hydraulically from a prime-mover to a driven means comprising a fluid pump unit adapted to be driven by the prime-mover, main fluid conduit lines for circulation of fluid from said pump to the driven means, and branch fluid conduit lines communicating with said main lines, said pump, said main conduit lines and said branch conduit lines providing a fluid circuit, and a control means which acts on the fluid in said circuit for varying the volume and direction of flow of the fluid supplied to the driven means and includes a control unit positioned in the circuit, a servo-motor mechanically connected to said control unit and supplied with fluid from said branch lines, a following valve connected in said branch lines for supplying fluid to said servo-motor for driving said motor in selected directions, and means for setting said following valve to control the movement of the servo-motor.

In the accompanying diagrammatic drawings:

Fig. 1 is a schematic plan view of a power transmission apparatus for an automobile.

Fig. 2 is a schematic view of a system for obtaining a starting pressure fluid.

Figs. 3 and 4 are schematic views of other systems for obtaining a starting pressure fluid.

Fig. 5 is a schematic plan view of a steering gear.

Fig. 6 is a vertical section of a converting valve.

Fig. 7 is a vertical section of a following valve.

Fig. 8 is a schematic plan view of a power transmission apparatus for an automobile.

Figs. 12 and 13 are views similar to Fig. 10 of two other steering gear constructions.

Fig. 14 is a side view of a differential gear used in the constructions of Figs. 12 and 13.

Figure 9:
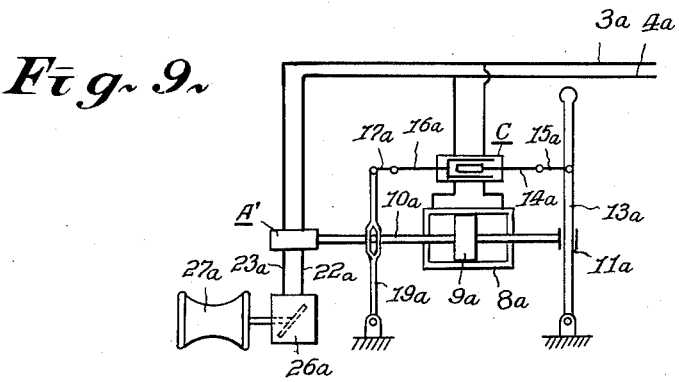
Fig. 9 is a schematic side view of a power transmission apparatus for a winch.

The power transmission apparatus illustrated in Figs. 1 to 4 and 6, comprises a prime-mover 1 which drives a reversible fluid pump 2 which has a swash or turn plate 3 which serves as a device for controlling the quantity of fluid discharged from the pump and can be adjusted freely and the direction of the discharged fluid can be easily reversed, the control being effected by variation of the angle of a swash plate 3. Pipes 4, 5 connect the pump with driven means, i. e. fluid-driven motors 26. The swash plate can be rotated by an arm 6 having one end pivoted to a piston rod 9 of a piston 10 is a servo-motor 8 through a connecting rod 7. Pipes 11, 12 are branch lines which connect pipes 4, 5 with a servo-motor 8 through a converting valve A, a generator B of starting pressure, and a following valve C (i. e. a valve for controlling a supply of fluid to, and therefore the direction of movement of, the servo-motor). A valve rod 13 of the valve cylinder of following valve C has one end pivoted to the arm 6 through a connecting rod 14. The valve C has a piston rod 15 pivoted through a connecting rod 16 with one end of a lever 17 pivoted at 18. An operating handle 19 serves as an actuator for controlling the valve C and is mounted on a pivot 20, the lower end of the handle being pivoted to a connecting rod 21 having an intermediate pivotal connection with the lever 17. The rod 21 is pivotally mounted on one end of a connecting rod 22 the other end of which is engaged loosely with the arm 6 through a clearance 23. Fluid which has leaked away is replaced from a tank 24 connected with the pipes 4, 5 through check valves 25. The fluid-driven motors 26 have driving shafts fixed with swash plates 27 therein.

Referring to Fig. 2, a centrifugal pump 29 is used as the generator B of starting pressure. In Fig. 3 the generator B comprises a pressure storage tank 31 which is connected with the pipe 12 through a pipe 32 in front of a check valve 30.

As shown in Fig. 4, the generator B comprises a gear pump 33 having a suction pipe 34 connected with the pipe 11 conducting low pressure fluid and an exhaust pipe 35 connected with the pipe 12 conducting high pressure fluid at the rear of the check valve 30. Pumps 29, 33 are so arranged as to be driven as desired by the prime-mover 1 acting through a clutch.

In the embodiment illustrated in Figure 5, the same reference numbers used in Figure 1 designate similar parts. In this construction, slave cylinders 36, 37 are connected with the fluid pipes 4 and 5, pistons 38 working in these cylinders and piston rods 39, 40 being connected with an arm rod 43 fixed to a shaft 42 of a ship's rudder 41 which can therefore be moved in accordance with movements of the handle 19.

The converting valve A, as is clear from Figure 6, consists of a valve case 44 and a piston valve member 53. The valve case 44 is provided with connections 45, 46, 49, 50 and internal annular slots 47, 48. At any given time, one of the connections 45, 46 serves as an inlet and and the other as an outlet and one of the connections 49, 50 serves as an inlet and the other as an outlet. A side opening 51 communicates with the outlet 50 through a side passage 52 and the piston valve member 53 is inserted in the valve case 44. The piston valve member 53 is divided into cylindrical parts 57, 58, 59 and 60 by thinner parts 54, 55, 56 and the surfaces of the cylindrical parts 58, 59 communicate with the end surfaces of the valve member 53 through curved passages 61, 62, respectively. The valve has an end cover 63.

The following valve C, as is clear from Figure 7, is provided with fluid connections 65, 66, 67, 68 and a side opening 69 in its outer cylinder 64, the opening 69 and the outlet 68 communicating through a passage 70 in the cylinder wall. At any given time, one of the connections 65, 66 serves as an inlet and the other as an outlet and one of the connections 67, 68 serves as an inlet and the other as an outlet. A valve cylinder 71 is fitted in the cylinder 64 and the outer surface of the cylinder 71 has annular slots communicating with the interior of the valve cylinder through small bores. The closed end of the cylinder 71 has a leakage hole 77 and is connected with the valve rod 13. Inside the valve cylinder 71 is a piston valve member 78 which is divided into cylindrical parts 82, 83, 84, 85 by thin parts 79, 80, 81 and which is provided with a leakage bore 86 extending between both end surfaces. The valve member 78 is connected with the valve rod 15. Covers 87, 88 close both ends of the outer cylinder 64.

The valve A acts so that the high pressure fluid is always discharged from the outlet 50 and low pressure fluid is returned through inlet 49, even when the pressure of fluid in the pipes 4, 5 and in the pipes 11, 12 is reversed. The action of the valve A will be clear from the following description and by reference to Figure 6.

If the connection 45 is supplied with high pressure fluid, then high pressure fluid passes to the right-hand side of the piston valve member 53 through a curved passage 61 and pushes the valve member 53 to the left. Therefore, the high pressure fluid entering through the connection 45 reaches the side opening 51 and flows into the outlet 50 through the side path 52.

Connection 46 is then the low pressure fluid outlet and is connected to the inlet 49 by the thin part 55 of the valve member. If high pressure fluid enters the connection 46, this fluid passes to the left-hand side of the piston valve member 53 and pushes the piston member 53 to the right. Therefore, high pressure fluid reaches the outlet 50 through the thin part 56 and low pressure fluid from the inlet 49 reaches the outlet connection 45 through the thin part 55. As a result, high pressure fluid always flows out of the outlet 50 to the inlet 66 of valve C and low pressure fluid flows from outlet 65 of valve C through inlet 49 of valve A.

As seen in Fig. 7, when the valve rod 15 is moved to the left, then the inlet connection 66 communicates with the outlet connection 67 through the annular slot 75, thin part 80, and annular slot 74. At the same time, low pressure fluid communicates with the outlet connection 65 through the annular slot 73, thin part 79, annular slot 72, and also through the side opening 69 and passage 70. Therefore, high pressure fluid will be supplied in the left-hand part of the cylinder 8 of the servomotor, resulting in movement of the piston 10 towards the right as viewed in Figure 1. Also, if the valve rod 15 is pushed towards the right, the high pressure fluid inlet connection 66 is connected to the outlet connection 68 through the annular slot 75, thin part 81, and annular slot 76 and low pressure fluid outlet 65 is connected to the outlet connection 67 through the annular slot 74, thin part 80, and annular slot 73. Therefore, high pressure fluid flows into the right-hand side of the cylinder 8, resulting in movement of the piston 10 towards the left.

With the movement of the piston 10 as described above, the swash plate 3 of the pump 2 rotates and varies its angle of inclination. At the same time, the valve cylinder 71 is moved in the same direction as the piston valve 78 by means of the connecting rods 13, 14 and communication between the annular slots 73, 75 and the thin parts 79, 80, 81 is shut off. Therefore, the supply of the fluid to the servomotor stops, resulting in stopping of the piston 10.

If the end of the connecting rod 22 is loosely connected with the arm 6 at the clearance 23 on said end, as is shown in Fig. 1 and Fig. 5, and the connecting rod 21 is allowed to move towards the left side or the right side, the piston valve member 78 at first moves slightly in accordance with the clearance and the piston 10 and the valve cylinder 71 will then move, resulting in the stopping of the piston 10 when movement of handle 19 stops. However, a gap permitting a little displacement in the same direction as that of the connecting rod 22 would again occur in the clearance in accordance with the rotation of the arm 6 so that it can repeat the above motions. Accordingly, it is possible to move or stop the piston 10 at its desired position, resulting in proper rotation of the arm 6.

Fig. 1 shows an application of this invention to the power transmission of an automobile.

If the prime-mover 1 is started with zero angle of the turn-plate 3 of the pump 2, the load of the pump 2 is a minimum. Consequently, the prime-mover 1 can start easily, but no pressure fluid will flow into the pipes 4, 5, so that the fluid motors 26 do not start.

If pressure fluid is supplied from the generator B of starting pressure to the servo-motor 8 by pressing the operating handle 19 which results in a slight movement of the piston 10 and a slight inclination of the turn plate 3 through rotation of the arm 6, a pressure difference will occur between the pressure fluids in the pipes 4, 5 and the motors 26 will gradually start, resulting in movement of the automobile. As the pressure difference may, after starting, be transmitted to the servomotor through the pipes 11, 12 it is not necessary to use the generator B to drive the servomotor 8. A centrifugal pump 29 or gear pump 33 or a piston pump may be used as the generator B of starting pressure as shown in Figs. 2 and 4. Such a pump can be driven by the prime-mover through a magnetic clutch and stopped by disengagement of the clutch at any desired time. The check valve 30 acts to supply the starting pressure to the servomotor 8, but does not hinder the passage of the pressure fluid supplied from the pump 2.

The quantities of fluid supplied in the pipes 4, 5, that is the amount of drive to the motors 26, can be easily varied by adjusting the inclination of the turn plate 3. The speed of the automobile may therefore be adjusted freely. Similarly, if the inclination of the turn plate 3 is adjusted in the negative direction (i. e. an inclination opposite to that in the case of forward driving) the direction of fluid in each of the pipes 4, 5 is reversed, resulting in reversal of the motors 26, and in backward motion of the automobile. Of course, speed control can also be easily effected in the case of backward movement by appropriate inclination of the operating handle 19. Although in the case of backward movement the fluid pressures in the pipes 11, 12 are reversed, the pressure conditions of the fluids become the same as in the case of forward movement at the inlet of the following valve C owing to the action of the converting valve A. As a result, there is no variation in the operation of the servomotor.

If the angle of inclination of the turn plate 3 is set at zero, there is no circulation of fluid through the pipes so that the fluid motors 26 cannot rotate even under the action of inertia. Thus the fluid-driven motors 26 can be braked and this braking can be gradually effected by decreasing gradually the inclination of the turn plate 3.

When the automobile travels along a curved road, the inside motor 26 slows down and more fluid flows through the outside motor 26, thereby increasing its speed. Thus, the motors 26 act as a differential gear mechanism. If desired, however, only one fluid motor, which drives the wheels of the automobile through a differential gear, may be used.

If a very small quantity of the fluid is circulated through the fluid pipes 4, 5, owing to a slight inclination of the swash plate 3, then it is possible to drive the automobile very slowly on level or sloping roads.

Fig. 5 shows the invention applied to a ship steering gear. In this construction also, it is possible to supply high and low pressure fluid into the cylinders 36, 37 through the pipes 4, 5 in accordance with the variation of the inclination of the swash plate 3 of the pump 2, the variation being caused by operation of the operating handle 19 and resulting in pushing or pulling the connecting rods 39, 40, rotation of the arm 43, and rotation of the rudder. However, the angle of the swash plate 3 should be returned to zero by operating rod 7 after the rudder has been set at the desired angle, otherwise the rudder will continue to rotate.

Fig. 8 shows a power transmission apparatus for an automobile in which reversing a valve A' is adapted to control the quantity or direction of the pressure fluid supplied to the fluid motors, whatever the quantity and direction of the pressure fluid supplied to the valve A'. In this construction a prime-mover 1a, such as an internal combustion engine or electric motor, drives a pump 2a connected with high pressure and low pressure pipes 3a, 4a, respectively, for circulating pressure fluid discharged from the pump, a tank 5a connected with the low pressure fluid pipe being used to compensate for leakage of fluid. Pipes 6a, 7a lead from the pipes 3a, 4a and are connected with a servomotor 8a through a following valve C exactly the same as in Figs. 1 and 5. The servomotor has a piston 9a having a piston rod 10a which is provided with a clearance 11a at one end, there being engaged loosely in this clearance an operating handle 13a pivoted to a stationary shaft 12a. The following valve C has a valve rod 14a. The rod 16a of the valve cylinder of the following valve C is connected with a control lever 19a pivoted to a stationary shaft 18a through a connecting rod 17a, the rod 19a being engaged at its eye 20a with a pin 21a projecting from the piston rod 10a. The fluid pipes 3a, 4a are connected with fluid pipes 22a, 23a through the reversing valve A' (the construction and operations of this valve will be hereinafter described) operated by the piston rod 10a. The pipes 22a, 23a communicate with the fluid motors 24a for driving shafts 25a.

Figure 11:
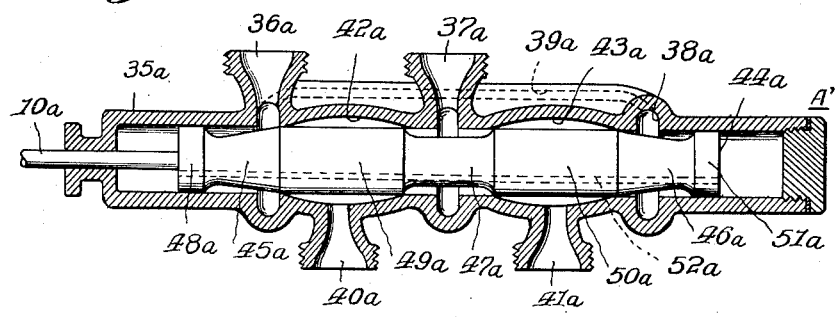
Fig. 11 is a vertical section of a converting valve used in accordance with this invention when a non-reversible fluid pump is also used.

As shown in Fig. 11, the outer cylinder 35a of the reversing valve A' is provided with high pressure fluid inlet port 36a, a low pressure outlet port 37a, a side opening 38a, motor ports 40a, 41a, which function as either inlet or outlet ports depending upon the direction of fluid flow in the motor supplied thereby, and a by-pass 39a connecting the inlet port 36a with the side opening 38a. A piston valve member 44a is fitted in the cylinder 35a and two enlarged spaces 42a, 43a are formed between the cylinder 35a and the piston-valve member 44a. The piston rod 10a is movably secured to the end of the valve member 44a. The piston valve member 44a is provided with tapered parts 45a, 46a, part 47a of reduced diameter, and cylindrical parts 48a, 49a, 50a, 51a. A leakage bore 52a extends from end to end of the piston valve member 44a. A cylinder 53a (Fig. 8) communicates with fluid pipes 3a, 4a at both sides, and a piston valve 57a slidable in the cylinder is provided with a transverse bore 54a, said valve being connected with the piston rod 10a through a control lever 55a and connecting rod 56a.

The reversing valve A' (Fig. 11) acts to vary the direction and the quantity of the pressure fluid discharged from its motor ports 40a, 41a, or to stop the flow of the fluid, whatever the direction of the fluid supplied to the high pressure inlet port 36a, and low pressure outlet port 37a.

If the high pressure and low pressure pipes are connected with the ports 36a, 37a, respectively, fluid would not flow through the motor ports 40a, 41a because, as illustrated, these motor ports are shut off from the inlet and outlet ports and from the side opening 38a by the cylindrical parts 49a, 50a of the piston valve member 44a. Now, if the piston valve member 44a is moved towards the left, then high pressure fluid entering through the high pressure inlet port 36a flows into the enlarged space 43a around the part 46a and finally flows out of the motor port 41a. At the same time, the low pressure outlet port 37a communicates with the motor port 40a through the enlarged space 42a. If the piston valve member 44a is moved towards the right, the side opening 38a is shut off by the cylindrical part 50a and high pressure fluid supplied from the high pressure inlet port 36a enters the enlarged space 42a around the part 45a, whence it flows out of the motor port 40a. At the same time, the low pressure outlet port 37a communicates with the motor port 41a through the enlarged space 43a. Thus, high pressure fluid can be discharged from either motor ports 40a, 41a in accordance with the movement of the piston valve member 44a, so that motion of the motors 24a can be reversed or stopped.

Furthermore, by movement of the piston valve member 44a from its central position toward the right, the passage between the side opening 38a and the enlarged space 42a can be increased gradually, owing to the slope of the circumferential surfaces of the part 45a, and the passage between the side opening 38a and the enlarged space 43a may be increased gradually owing to the slope of the circumferential surfaces of the part 46a upon movement of piston valve member 44a to the left. The quantity of fluid passing through reversing valve A' is, therefore, small at first, owing to the narrow passage initially provided, and becomes gradually larger. As a result, it is possible to start or stop the fluid motor gradually. Even when the direction of the fluid to be supplied to the ports 36a, 37a or the positions of the motor ports is reversed, the same operations and results are obtained.

Referring now to Figures 8 and 11, if the piston valve member 78 of the following valve C is operated by the handle 13a through the connecting rods 15a, 14a, the piston 9a of the servo-motor 8a is operated, and the piston valve member 44a in the reversing valve A' is moved so as to shut off the communication between the pipes 3a, 4a and the pipes 22a, 23a, and the prime-mover 1a will be started and will operate without any load because the fluid supplied from pump 2 to the pipes 3a, 4a will pass directly through the bore 54a of the piston 57a.

If the valve A' is then actuated by means of the operating handle 13a acting through the servo-motor 8a so that the pressure fluid discharged from the pipes 3a, 4a is supplied to the fluid motors 24a through the pipes 22a, 23a, the motors will start to drive the driving shafts 25a so that the automobile will gradually start.

The quantity of the fluid circulated through the pipes 22a, 23a varies infinitely in accordance with the displacement of the piston valve member 44a in the converting valve A' resulting in infinite variation of the speed of rotation of the motors 24a so that the speed of the automobile can easily be regulated.

On the other hand, if the direction of fluid in the pipes 22a, 23a is reversed by appropriate operation of the converting valve A', the direction of rotation of the motors 24a is reversed so that the automobile will move backwards.

If the converting valve A' is operated to shut off communication between the fluid pipes 3a, 4a and the pipes 22a, 23a, the suction and discharge of the fluid in the motors 24a will become impossible, so that rotation of the motors 24a and movement of the vehicle will stop. If the valve is shut out gradually, the braking also will be gradual.

When the automobile travels along a curved road, the outer motor 24a may be driven at a higher speed than the inner one. Thus, the effect of a differential gear mechanism is obtained. It will be appreciated that only one motor 24a need be used, the shafts 25a being then driven through a differential gear mechanism. If a small quantity of fluid is circulated in the pipes 22a, 23a, the automobile can be driven at very low speed on any flat or sloping road.

Fig. 9 shows the invention applied to a winch-driving apparatus, the same parts as those shown in Fig. 8 being designated by the same reference numbers. A fluid motor 26a is used for driving a winch drum 27a. The fluid motor 26a can be stopped or reversed and its speed controlled by operating the converting valve A' by means of operating handle 13a and servo-motor 8a. The operation of the winch is then very simple in comparison with those using electric motors or other engines.

Figure 10:
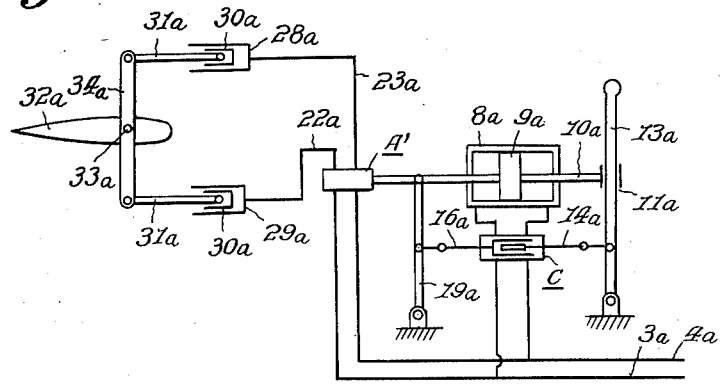
Fig. 10 is a schematic plan view of a steering gear.

Fig. 10 shows another embodiment of the invention applied to a ship steering gear, the same reference numbers as those of Fig. 8 designating similar parts. Slave cylinders 28a, 29a are connected with the pipes 22a, 23a and contain pistons 30a connected by rods 31a with an arm 34a fixed on a shaft 33a of a rudder 32a. The rudder 32a can be rotated by controlling the supply of pressure fluid to the motors 28a, 29a and can be held in any desired position by discontinuing the supply.

In Figs. 12 and 13 is shown a construction in which a rudder is controlled by using a mechanism with a differential gear device. A prime-mover 1b drives a reversible pump 2b, and the quantity and direction of the pressure fluid circulating in the pipes 5b, 6b may be varied by movement of a swash-plate 3b controlled by an arm 4b. Steering motors 7b, 8b are connected with the ends of the fluid pipes 5b, 6b, piston rods 9b, 10b of said motors being connected with an arm 13b fixed to a shaft 12b of the rudder 11b. Fluid pipes 5b, 6b are connected with the fluid pipes 14b, 15b through a converting valve A such as is described in detail in connection with the embodiment of Fig. 1, which latter pipes supply pressure fluid to a servo-motor 16b. As in the Fig. 1 construction, the apparatus includes a generator B of starting pressure and a following valve C, a cylinder rod 18b of the valve C being pivoted to the arm 4b. The servo-motor 16b has a piston provided with a piston rod 20b pivoted to the arm 4b through an intermediate link. The apparatus is provided with a differential gear device D shown most clearly in Fig. 14 and comprising bevel-gears 21b, 23b, toothed wheels 22b, 24b and planet wheels 25b, the shaft 26b of which is connected with the operating rod 17b of the following valve C. A toothed segment 27b is pivoted to the shaft 28b and a toothed segment 29b is pivoted to the shaft 30b. A connecting rod 31b is connected with the arm 13b and is provided with a pin 32b projecting from its side and engaged in an eye at the end of the crank 33b. A rod 34b connects the crank 33b with the segment 29b. A cylinder 35b is arranged on the end of the rod 31b and a piston inside it is connected with an end of the operating rod 36b coupled with an operating handle (not shown). A pin 37b projects from the side of the operating rod 36b and is engaged in an eye at one end of the crank 38b. A rod 39b connects the crank 38b with the segment 27b.

If the operating rod 36b is moved in the direction of the arrow, the crank 38b and the segment 27b also rotate in the direction indicated by the arrow, and the gears 22b, 21b rotate to cause the planet wheels 25b to revolve. The shaft 26b therefore rotates in the direction of the full line arrow and the operating rod 17b is moved towards the right. As a result, pressure fluid supplied from the outlet of the converting valve A enters the servo-motor through the following valve C and moves the piston 19b in accordance with the displacement of the operating rod 17b, that is, of the operating rod 36b. In accordance with rotation of the arm 3b, the swash plate 3b of the pump 2b is inclined and high pressure fluid flows into the pipe 5b and is withdrawn from the pipe 6b, resulting in rotation of the rudder 11b in the direction indicated by the full line arrow. Accompanying the rotation of the rudder, the connecting rod 31b is moved in the broken arrow direction indicated by the broken arrow, and the crank 33b, gears 24b, 23b and segment 29b are also rotated in the direction of the broken arrow, resulting in a reverse revolution of the planet wheels 25b. As a result, the shaft 26b (and with it the operating rod 17b of the following valve C) and the servo-motor 16b are restored to their initial positions and the swash plate 3b returns to its neutral position so as to stop the circulation of the pressure fluid in the pipes 5b, 6b and to maintain the rudder 11b at its desired position. Motion of the operating rod 36b in the opposite direction will lead to a similar sequence of operations. On starting, the swash plate 3b of the pump 2b first occupies its neutral position so that pressure fluid will not be supplied to the fluid pipes 5b, 6b and the driving of servo-motor 16b is impossible. Such defects may be eliminated by supplying a pressure fluid of constant direction from a generator B operated in relation to the operation of the rod 36b. The pressure of fluid in the pipes 5b, 6b depends on the direction of rotation of the plate 3b. A fluid of constant pressure and direction will always be supplied to the following valve C owing to the presence of the converting valve A.

The modification of Fig. 13 is such that pressure fluid of constant direction may always be supplied to the fluid pipes by a pump (not shown) instead of the pump 2b of the Fig. 12 construction.

In Fig. 13, the same numbers as those in Fig. 12 designate similar parts. Fluid pipes 40b, 41b are supplied with a fluid circulating in a constant direction from a pump. A control lever 42b is pivoted to the stationary shaft 43b at one end and is pivoted to the moving cylinder of the valve C at the other end. It is also connected with the piston rod 20b at an intermediate position. A piston 44b is provided with a central passage, is fixed to the right-hand end of the piston rod 20b, and is fitted in a cylinder 45b communicating with the pipes 40b, 41b at the central part of its wall. Pipes 46b, 47b lead from pipes 40b, 41b and communicate with the servo-motor 16b through the following valve C. The converting valve A' is of the same construction as the converting valve A' in Figs. 8 and 10.

The operation of this arrangement is almost the same as that of Fig. 12, the operation of the differential gear device D being exactly the same. However, the converting valve A' is arranged to be so operated by the servo-motor 16b that high pressure fluid may be supplied into the fluid motor 7b or 8b to rotate the rudder 11b. The rudder can be maintained at the desired angle as the pipes 40b, 41b are shut off by the converting valve A', owing to the operation of the differential gear device D, so that the fluid motors 7b and 8b stop. If the rudder angle should differ from the angle selected by the operating handle, owing to leakage of fluid or to any other cause, the segment 29b rotates in the opposite direction and the differential gear device D operates the servo-motor 16b to restore the rudder to the desired angle.

With a steering gear such as is illustrated in Figs. 12 and 13, the fluid power-transmission apparatus may be arranged in the lower decks of a ship and communication between the bridge and the lower deck may be effected by connecting rods, levers, or steel wires. Thus, if the pipes burst, there is no danger that the rudder will rotate until it encounters an obstruction with consequent turning of the ship. Such accidents have frequently occurred with the well-known telemotor systems. Furthermore, in the event of a break in the pipes of the apparatus, it is possible to control the steering by telephone communication between the lower decks and the bridge.

Figure 15:
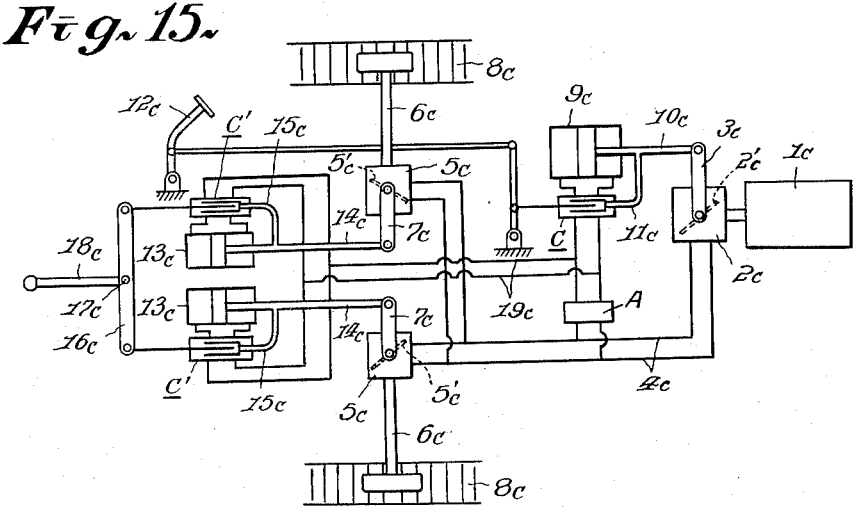
Figs. 15 and 16 are schematic plan views of two different devices for driving endless track vehicles.

Fig. 15 illustrates an application of the invention for driving a tractor having endless tracks 8c. A prime-mover 1c drives a reversible pump 2c having a swash plate 2c' the angle of which can be so adjusted by an arm 3c so that the quantity and direction of the pressure fluid in the pipes 4c can be varied. Reversible fluid motors 5c are connected with side driving shafts 6c. Arms 7c drive the swash plates 5c'. A servo-motor 9c drives the arm 3c through a rod 10c. A branch rod 11c leads from the rod 10c so as to slide the valve cylinder of the following valve C in relation to motion of the rod 10c. A pedal 12c operates the piston valve member of the valve C. Servo-motors for operating the arms 7c of the swash plates 5c' in the fluid motors 5c are connected with the arms 7c through connecting rods 14c. Branch rods 15c diverge from the rods 14c so as to slide the valve cylinders of the following valves C' of the servo-motors 13c in relation to the motion of the rods 14c. A lever 16c is pivoted to the handle 18c at the pivot 17c in such manner that it will move the piston valve members of the following valves C' in opposite directions through the connecting rods pivoted to the ends of the lever 16c. Fluid pipes 19c connect the converting valve A with both of the following valves C'. The valves A, C, C' in this embodiment are of a construction similar to that of the valves A and C of Figures 1 and 5.

The pressure fluid generated from the pump 2c is supplied to the servo-motors 9c, 13c through the valves C, C', respectively, after it has been rectified into a fluid circulating in a constant direction by the converting valve A. Therefore, if the piston valve member of the following valve C is moved by operation of the pedal 12c, it becomes possible to slide the piston of the servo-motor 9c in any desired direction or to stop it at any desired position and thereby to vary the inclination of the swash plate 2c' through the rod 10C and arm 3c, with consequent variation in the quantity of the pressure fluid discharged from the pipes 4c or to effect reversal of its direction so that the speed or direction of rotation of the motor 5c and, consequently, the speed or direction of movement of the tractor, can therefore be easily controlled by moving the pedal 12c so as to adjust the quantity and direction of the pressure fluid discharged from the pipes 4c. When pressure fluid is supplied from a generator (not shown) of starting pressure, such as the generator B of Figure 1, to the servo-motor 9c and the pedal 12c is operated to move the swash plate of the pump 2c from its neutral position, then pressure will be supplied through pipes 4c to the motor 5c and the tractor will start gradually. If the swash plate of the pump 2c is set to its neutral position, then not only will no pressure fluid be discharged into the pipes 4c, but the circulation of the fluid in the pipes 4 will also be checked so that any skidding of the motors 5c can be effectively prevented and, at the same time, the wheels may be braked.

If the handle 18c is rotated in one direction, the piston of the following valves C' slides in the opposite direction to vary the inclination of the turn plates of the motors 5c and thereby to reduce the speed of one driving wheel and increase the speed of the other. The tractor can therefore easily be advanced along a curved road.

Figure 16:
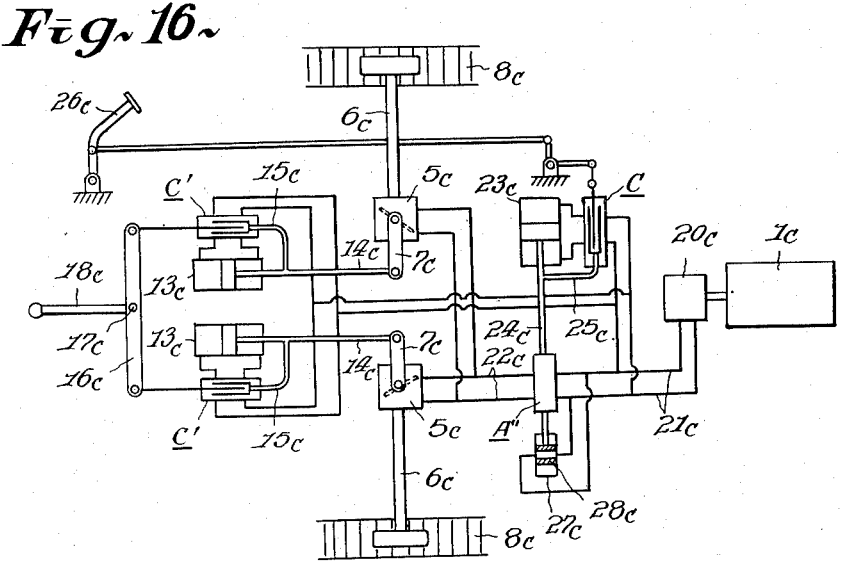

In the embodiment illustrated in Fig. 16, the same reference numbers as are used in Fig. 15 indicate similar parts. A non-reversible pump is connected with the reversing valve A" and the following valve C by pipes 21c, pipes 22c connecting the valve A" with the non-reversible motors 5c. A servo-motor 23c is connected by a rod 24c with the reversing valve A". A pedal 26c serves for sliding the piston of the following valve C. A cylinder 27c is provided with two holes in its wall which communicate with two pipes 21c. A piston 28c is provided with a diametrical hole and is so connected with the valve A" as to be slidable in the cylinder 27c.

The pipe 21c discharges pressure fluid circulating in a constant direction and this fluid may be supplied to the servo-motors 13c and 23c through the following valves C and C' and, at the same time, to the motors 5c through the reversing valve A". Therefore, if the following valve C of the servo-motor 23c is operated properly by the pedal 26c and the piston of the reversing valve A" is moved, the quantity of the discharged pressure fluid increases or decreases, or its circulating direction is reversed, in accordance with the piston movement, thereby obtaining speed control, braking or reversal of the driving wheels connected with the motors 5c. Movement for a curved road is effected by controlling the handle 18c as in the Fig. 15 construction. If sliding movement of the piston 28c is such that the diametrical hole of the piston 28c coincides with the fluid passing holes of the cylinder 27c when the pipe 21c has been shut off by the reversing valve A", the pump 20c and pipes 21c would not be damaged at all.

With the driving apparatus of Figs. 15 and 16, any curved advance of the tractor is very easily effected because it permits the speed or rotating direction of a driven track on one side to differ from that of the driven track on the other side. Hitherto, any curved advance on a sand road, slippery road, or mud road has been very difficult owing to braking of the track on one side. It is also possible to control continuously the speed of the tracks by controlling of the quantity of the pressure fluid supplied. Therefore, climbing ability increases. Furthermore, the construction, protection, and maintenance of such a vehicle is very simple, because it is not necessary to provide a clutch, speed reduction gear, or any other braking device.

I claim:

1. A pump and motor hydraulic system for use in transmitting power hydraulically from a prime mover to a driven means comprising, in combination, a fluid pump unit adapted to be driven by the prime mover, main fluid conduit lines for circulation of fluid from said pump to the driven means, and branch fluid conduit lines communicating with said main lines, said pump, said main conduit lines and said branch conduit lines providing a fluid circuit, and a control assembly acting upon the fluid in said circuit for varying the volume and direction of flow of the fluid supplied to the driven means, said control assembly including a direction control unit, a servo-motor mechanically connected to said direction control unit and supplied by fluid from said branch lines, a following valve connected in said branch lines for supplying fluid to said servo-motor for driving said motor in selected directions, and means for setting said following valve to control the movements of the servo-motor, said following valve comprising an outer cylindrical portion provided with first outlet and inlet connections communicating with said branch lines and second outlet and inlet connections communicating with said servo-motor, said inlet and outlet connections communicating with the interior of said outer cylinder and a side opening axially spaced in said outer cylinder from said inlet and outlet connections and communicating with one of said second inlet and outlet connections, a valve cylinder member slidably positioned for axial movement inside said outer cylindrical portion, said valve cylinder having annular slots on its outer surface communicating with the interior of the valve cylinder, and a piston member slidably mounted inside said valve cylinder for axial movement therein, said valve cylinder being connected to a lever and said lever being connected to the piston of the servo-motor for simultaneous movement of said valve cylinder with said piston, and said piston valve member being connected to said setting means, whereby the fluid flow in said second outlet and inlet connections is reversed or cut off by moving said piston valve member and said valve cylinder to certain positions.

2. A pump and motor hydraulic system for use in transmitting power hydraulically from a prime mover to a driven means comprising, in combination, a fluid pump unit adapted to be driven by the prime mover, main fluid conduit lines for circulation of fluid from said pump to the driven means, and branch fluid conduit lines communicating with said main lines, said pump, said main conduit lines and said branch conduit lines providing a fluid circuit, and a control assembly acting upon the fluid in said circuit for varying the volume and direction of flow of the fluid supplied to the driven means, said control assembly including a direction control unit in the form of a swash plate associated with said pump, a servo-motor mechanically connected to said swash plate and supplied by fluid from said branch lines, a following valve connected in said branch lines for supplying fluid to said servo-motor for driving said motor in selected directions, and means for setting said following valve to control the movements of the servo-motor, said following valve comprising an outer cylindrical portion provided with first outlet and inlet connections communicating with said branch lines and second outlet and inlet connections communicating with said servo-motor, said inlet and outlet connections communicating with the interior of said outer cylinder and a side opening axially spaced in said outer cylinder from said inlet and outlet connections and communicating with one of said second inlet and outlet connections, a valve cylinder member slidably positioned for axial movement inside said outer cylindrical portion, said valve cylinder having annular slots on its outer surface communicating with the interior of the valve cylinder, and a piston member slidably mounted inside said valve cylinder for axial movement therein, said valve cylinder being connected to a lever and said lever being connected to the piston of the servo-motor for simultaneous movement of said valve cylinder with said piston, and said piston valve member being connected to said setting means, whereby the fluid flow in said second outlet and inlet connections is reversed or cut off by moving said piston valve member and said valve cylinder to certain positions.

3. A pump and motor hydraulic system for use in transmitting power hydraulically from a prime mover to a driven means comprising, in combination, a fluid pump unit adapted to be driven by the prime mover, main fluid conduit lines for circulation of fluid from said pump to the driven means, and branch fluid conduit lines communicating with said main lines, said pump, said main conduit lines and said branch conduit lines providing a fluid circuit, and a control assembly acting upon the fluid in said circuit for varying the volume and direction of flow of the fluid supplied to the driven means, said control assembly including a direction control unit in the form of a swash plate associated with said pump, a servo-motor mechanically connected to said swash plate and supplied by fluid from said branch lines, a following valve connected in said branch lines for supplying fluid to said servo-motor for driving said motor in selected directions, means for setting said following valve to control the movements of the servo-motor, and a converting valve in communication with said following valve for supplying fluid unidirectionally to said following valve regardless of the direction of fluid flow in said main conduit lines, said following valve comprising an outer cylindrical portion provided with first outlet and inlet connections communicating with said branch lines and second outlet and inlet connections communicating with said servo-motor, said inlet and outlet connections communicating with the interior of said outer cylinder and a side opening axially spaced in said outer cylinder from said inlet and outlet connections and communicating with one of said second inlet and outlet connections, a valve cylinder member slidably positioned for axial movement inside said outer cylindrical portion, said valve cylinder having annular slots on its outer surface communicating with the interior of the valve cylinder, and a piston member slidably mounted inside said valve cylinder for axial movement therein, said valve cylinder being connected to a lever and said lever being connected to the piston of the servo-motor for simultaneous movement of said valve cylinder with said piston, and said piston valve member being connected to said setting means, whereby the fluid flow in said second outlet and inlet connections is reversed or cut off by moving said piston valve member and said valve cylinder to certain positions.

4. A pump and motor hydraulic system for use in transmitting power hydraulically from a prime mover to a driven means comprising, in combination, a fluid pump unit adapted to be driven by the prime mover, main fluid conduit lines for circulation of fluid from said pump to the driven means, and branch fluid conduit lines communicating with said main lines, said pump, said main conduit lines and said branch conduit lines providing a fluid circuit, and a control assembly acting upon the fluid in said circuit for varying the volume and direction of flow of the fluid supplied to the driven means, said control assembly including a direction control unit positioned in the fluid circuit, a servo-motor mechanically connected to said direction control unit and supplied by fluid from said branch lines, a following valve connected in said branch lines for supplying fluid to said servo-motor for driving said motor in selected directions, means for setting said following valve to control the movements of the servo-motor, said control unit being in the form of a reversing valve having a reciprocatable piston for regulating the direction and volume of fluid flow in said main line, and said servo-motor being connected to the piston of said reversing valve, said following valve comprising an outer cylindrical portion provided with first outlet and inlet connections communicating with said branch lines and second outlet and inlet connections communicating with said servo-motor, said inlet and outlet connections communicating with the interior of said outer cylinder and a side opening axially spaced in said outer cylinder from said inlet and outlet connections and communicating with one of said second inlet and outlet connections, a valve cylinder member slidably positioned for axial movement inside said outer cylindrical portion, said valve cylinder having annular slots on its outer surface communicating with the interior of the valve cylinder, and a piston member slidably mounted inside said valve cylinder for axial movement therein, said valve cylinder being connected to a lever and said lever being connected to the piston of the servo-motor for simultaneous movement of said valve cylinder with said piston, and said piston valve member being connected to said setting means, whereby the fluid flow in said second outlet and inlet connections is reversed or cutoff by moving said piston valve member and said valve cylinder to certain positions.

5. A pump and motor hydraulic system as defined in claim 2, wherein said means for setting said following valve to control the movements of the servo-motor also includes means mechanically connected to the mechanical connection between said servo-motor and said valve means.

6. A pump and motor hydraulic system as defined in claim 4, wherein said means for setting said following valve to control the movements of the servo-motor also includes means for mechanically acting upon the servo-motor.

7. A pump and motor hydraulic system as defined in claim 4, further comprising a by-pass valve in said main conduit lines, said by-pass valve having a piston, said piston being connected to the connection between the servo-motor and said converting valve.

8. A pump and motor hydraulic system as defined in claim 4, further comprising a by-pass valve in said main conduit lines, said by-pass valve having a piston and said by-pass valve piston being connected to the piston of said converting valve.

9. A pump and motor hydraulic system for use in transmitting power hydraulically from a prime mover to a driven means comprising, in combination, a fluid pump unit adapted to be driven by the prime mover, main fluid conduit lines for circulation of fluid from said pump to the driven means, and branch fluid conduit lines communicating with said main lines, said pump, said main conduit lines and said branch conduit lines providing a fluid circuit, and a control assembly acting upon the fluid in said circuit for varying the volume and direction of flow of the fluid supplied to the driven means, said control assembly including a direction control unit positioned in the fluid circuit, a servo-motor mechanically connected to said direction control unit and supplied by fluid from said branch lines, a following valve connected in said branch lines for supplying fluid to said servo-motor for driving said motor in selected directions, means for setting said following valve to control the movements of the servo-motor, said control unit being in the form of a reversing valve having a reciprocatable piston for regulating the direction and volume of fluid flow in said main line, and said servo-motor being connected to the piston of said reversing valve, said following valve comprising an outer cylindrical portion provided with first outlet and inlet connections communicating with said branch lines and second outlet and inlet connections communicating with said servo-motor, said inlet and outlet connections communicating with the interior of said outer cylinder and a side opening axially spaced in said outer cylinder from said inlet and outlet connections and communicating with one of said second inlet and outlet connections, a valve cylinder member slidably positioned for axial movement inside said outer cylindrical portion, said valve cylinder having annular slots on its outer surface communicating with the interior of the valve cylinder, and a piston member slidably mounted inside said valve cylinder for axial movement therein, said valve cylinder being connected to a lever and said lever being connected to the piston of the servo-motor for simultaneous movement of said valve cylinder with said piston, and said piston valve member being connected to said setting means, whereby the fluid flow in said second outlet and inlet connections is reversed or cut off by moving said piston valve member and said valve cylinder to certain positions, said reversing valve comprising a valve cylinder member provided with axially-staggered first inlet and outlet connections and second inlet and outlet connections, a side opening providing communication between one of said first inlet and outlet openings of the reversing valve and an axially spaced-apart point in the interior of said reversing valve cylinder, the interior wall of said last-named valve cylinder being formed with enlarged portions between the inlet and outlet openings therein and the piston of said reversing valve being slidably positioned in said last-named valve cylinder and having tapered portions of minor diameter and cylindrical portions of major diameter.

References Cited in the file of this patent

UNITED STATES PATENTS

| | | |
|---|---|---|
| 1,854,226 | Rouse | Apr. 19, 1932 |
| 2,028,089 | Erling | Jan. 14, 1936 |
| 2,161,439 | Thoma | June 6, 1939 |
| 2,221,150 | Rebeski | Nov. 12, 1940 |
| 2,238,063 | Kendrick | Apr. 15, 1941 |
| 2,336,911 | Zimmerman | Dec. 14, 1943 |
| 2,347,261 | Harrington et al. | Apr. 25, 1944 |
| 2,486,816 | Beek | Nov. 1, 1949 |
| 2,487,520 | Brown | Nov. 8, 1949 |
| 2,629,226 | Polson | Feb. 24, 1953 |

FOREIGN PATENTS

| | | |
|---|---|---|
| 317,723 | Germany | Dec. 29, 1919 |